(12) United States Patent
Corneau et al.

(10) Patent No.: US 12,115,633 B2
(45) Date of Patent: Oct. 15, 2024

(54) LOG HANDLING TOOL

(71) Applicants: Gene Corneau, Tupper Lake, NY (US); Michael Corneau, Tupper Lake, NY (US)

(72) Inventors: Gene Corneau, Tupper Lake, NY (US); Michael Corneau, Tupper Lake, NY (US)

( * ) Notice: Subject to any disclaimer, the term of this patent is extended or adjusted under 35 U.S.C. 154(b) by 105 days.

(21) Appl. No.: 17/973,649

(22) Filed: Oct. 26, 2022

(65) Prior Publication Data

US 2024/0139912 A1  May 2, 2024

(51) Int. Cl.
*B25B 9/04* (2006.01)
*B65G 7/12* (2006.01)
*E04G 21/16* (2006.01)

(52) U.S. Cl.
CPC .................. *B25B 9/04* (2013.01); *B65G 7/12* (2013.01); *E04G 21/162* (2013.01)

(58) Field of Classification Search
CPC ................................ B65G 7/12; E04G 21/162
See application file for complete search history.

(56) References Cited

U.S. PATENT DOCUMENTS

| | | | | |
|---|---|---|---|---|
| 657,294 A * | 9/1900 | Norcross | ................ | E04G 21/16 16/DIG. 15 |
| 800,341 A * | 9/1905 | Tift | ................ | E04G 21/16 294/62 |
| 828,576 A * | 8/1906 | Shaffrank | ................ | E04G 21/16 294/62 |
| 1,041,949 A * | 10/1912 | Bandemer | ................ | E04G 21/16 269/208 |
| 1,153,269 A * | 9/1915 | Strum, Sr. | ................ | E04G 21/16 294/62 |
| 1,581,077 A * | 4/1926 | Mosier | ................ | E04G 21/162 294/62 |
| 1,586,475 A * | 5/1926 | Schondelmayer | ................ | B65G 7/12 294/62 |
| 2,457,646 A * | 12/1948 | Wilmot | ................ | E04G 21/162 235/61 NV |
| 2,706,131 A * | 4/1955 | Matz | ................ | B65G 7/12 294/16 |
| 4,055,364 A * | 10/1977 | Breite | ................ | B65G 7/12 294/903 |
| 4,105,238 A | 8/1978 | Stright | | |
| 4,225,170 A | 9/1980 | Flynn | | |
| 4,307,909 A | 12/1981 | Yaworski | | |
| 4,449,743 A | 5/1984 | Pankratz | | |
| 4,932,698 A | 6/1990 | Porter | | |
| 2009/0096228 A1 * | 4/2009 | Bahler | ................ | B65G 7/12 294/62 |

FOREIGN PATENT DOCUMENTS

FR  2987384 A1 *  8/2013  ............... B65G 7/12
FR  2851325        2/2014

* cited by examiner

*Primary Examiner* — Tyrone V Hall, Jr.

(57) ABSTRACT

A log handling tool for gripping a log between a pair of engagement members while using a spacer to facilitate positioning of the log includes a front engagement member and a rear engagement member opposing the front engagement member. The rear engagement member is fixed relative to a main arm, and the front engagement member is pivotable about the main arm such that a log can be gripped between the front and rear engagement members. A spacer is also coupled to said main arm and extends therefrom to facilitate positioning a log between the front and rear engagement members.

14 Claims, 3 Drawing Sheets

LOG HANDLING TOOL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to log handling tools and more particularly pertains to a new log handling tool to facilitate the lifting and moving of logs with one hand.

(2) Description of Related Art Including Information Disclosed Under 37 CFR 1.97 and 1.98

The prior art relates to log handling tools and includes a device which has a pair of pinching engagement members for gripping a log on opposing ends when one engagement member is pivoted toward the other engagement member. However, the prior art does not disclose means for accommodating smaller logs nor an included tool for moving a log away from an abutting surface.

BRIEF SUMMARY OF THE INVENTION

An embodiment of the disclosure meets the needs presented above by generally comprising a main arm having a front end and a rear end. A rear arm is coupled to the rear end of the main arm and extends downwardly therefrom. The rear arm has distal end with respect to the main arm. A front arm is pivotally coupled to the main arm adjacent to the front end and extends downwardly from the main arm in a same direction as the rear arm. The front arm has a terminal end positioned distal to the main arm. A handle is attached to the front arm such that the main arm is positioned between the handle and the terminal end. A rear engagement member is coupled to the rear arm adjacent to the distal end and has an engagement end facing toward the front arm. A front engagement member is coupled to the front arm adjacent to the terminal end and has an engagement end facing toward the rear arm. The front engagement member is configured to engage an end of a log and urge the log against the rear engagement member when the handle is pivoted away from the main arm to releasably secure the log to the main arm. A spacer is coupled to the main arm and extends downwardly therefrom. The spacer facilitates positioning the log between the front engagement member and the rear engagement member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
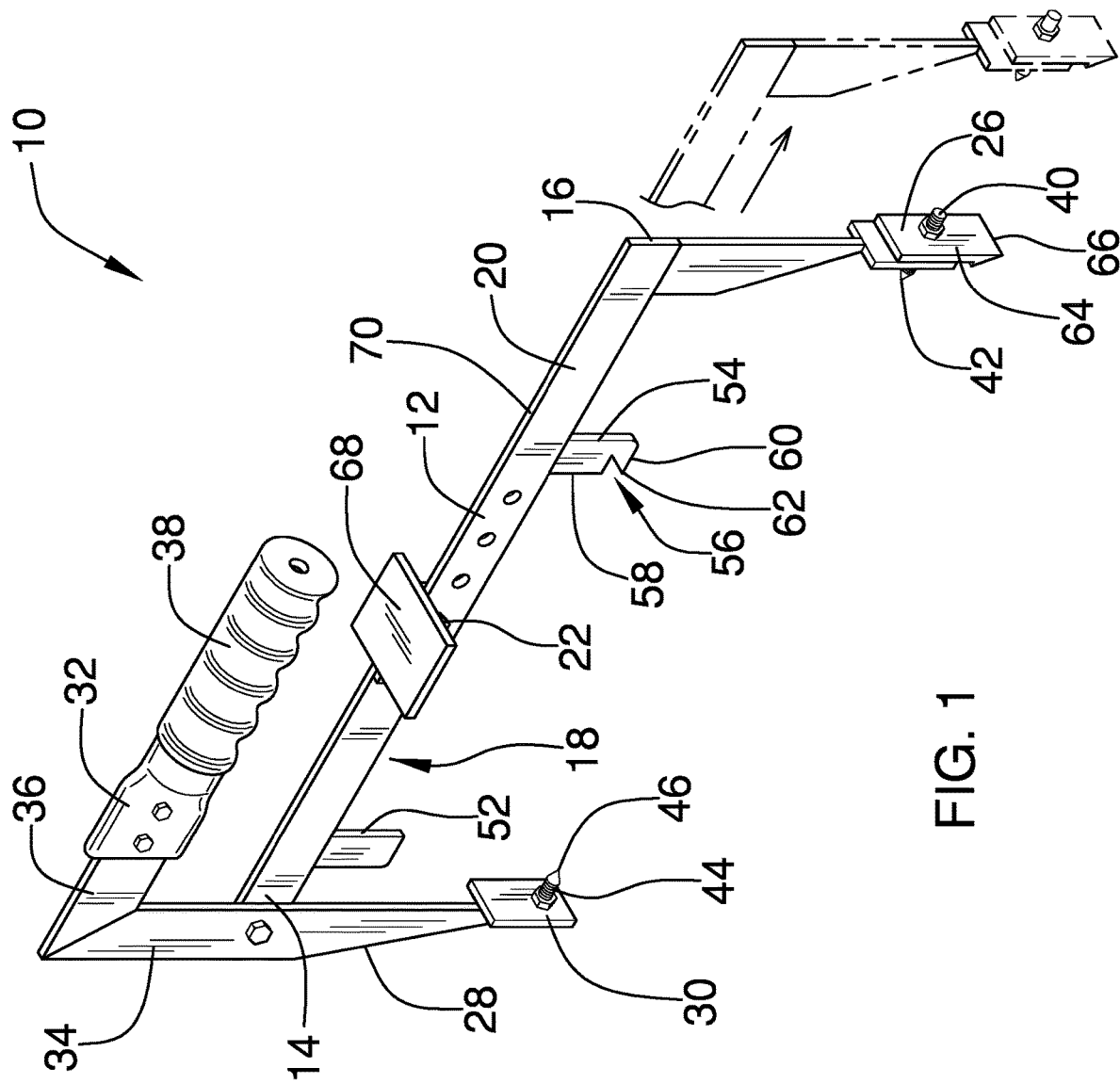
FIG. 1 is a front perspective view of a log handling tool according to an embodiment of the disclosure.
Figure 2:
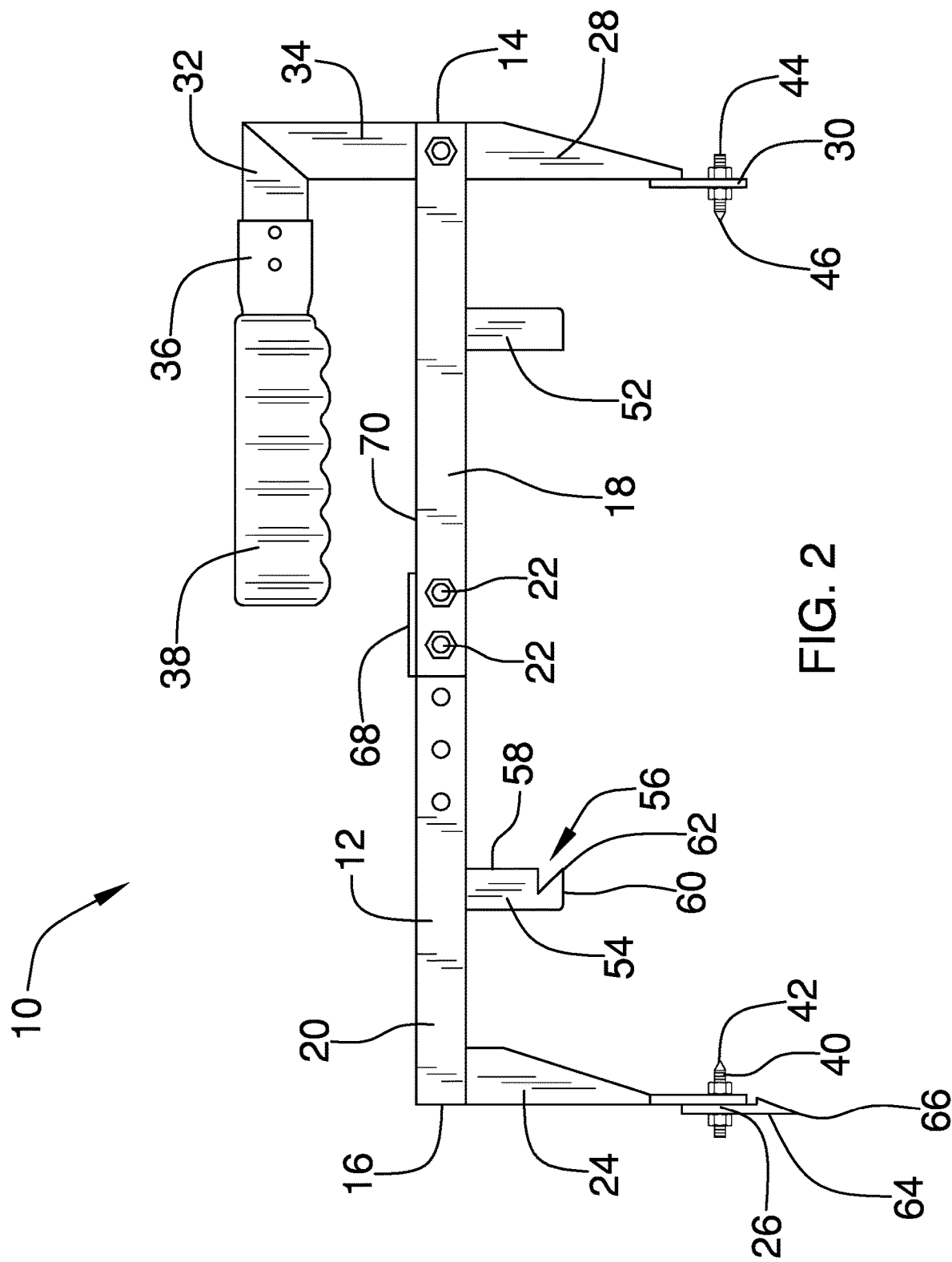
FIG. 2 is a rear view of an embodiment of the disclosure.
Figure 3:
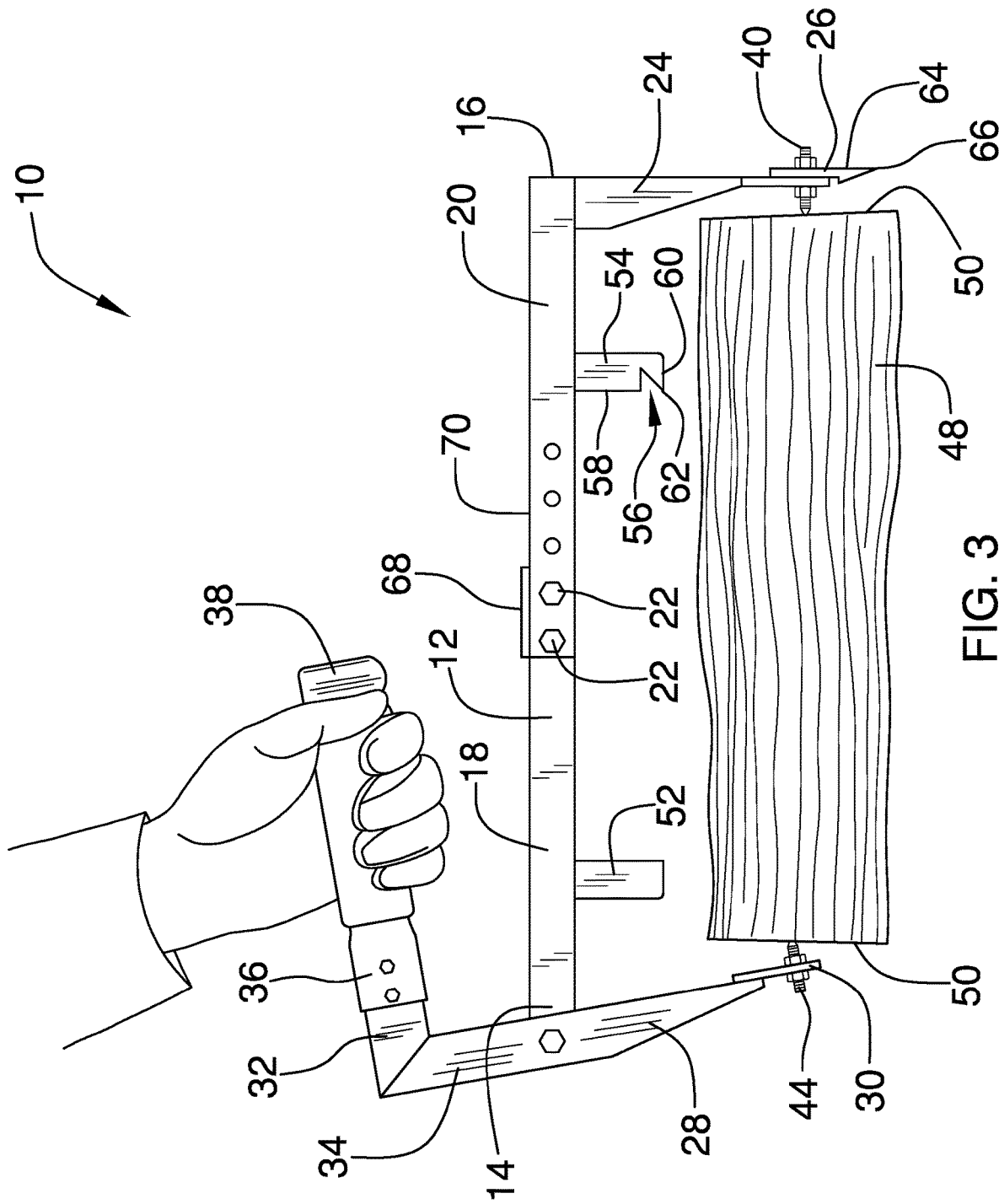
FIG. 3 is an in-use view of an embodiment of the disclosure.

With reference now to the drawings, and in particular to FIGS. 1 through 3 thereof, a new log handling tool embodying the principles and concepts of an embodiment of the disclosure and generally designated by the reference numeral 10 will be described.

As best illustrated in FIGS. 1 through 3, the log handling tool 10 generally comprises a main arm 12 having a front end 14 and a rear end 16. The main arm 12 comprises a front member 18 and a rear member 20, wherein the rear member 20 is securable to the front member 18 in a plurality of positions to adjust a distance between the front end 14 and the rear end 16. The rear member 20 is attachable to the front member 18 by a pair of couplers 22 extending through each of the front member 18 and the rear member 20, but may be slidably coupled, pivotably coupled, or the like and be securable in one of the plurality of positions via a locking pin, set screw, spring-biased member, or the like. The main arm 12 may alternatively be a unitary construction with a non-adjustable distance between the front end 14 and the rear end 16.

A rear arm 24 is coupled to the rear end 16 of the main arm 12 and extends downwardly therefrom. The rear arm 24 has a distal end 26 with respect to the main arm 12. A front arm 28 is pivotally coupled to the main arm 12 adjacent to the front end 14 and extends downwardly from the main arm 12 in a same direction as the rear arm 24. The front arm 28 has a terminal end 30 positioned distal to the main arm 12. A handle 32 is attached to the front arm 28 such that the main arm 12 is positioned between the handle 32 and the terminal end 30. The handle 32 includes a first section 34 extending upwardly from the main arm 12 and a second section 36 extending rearwardly. A grip 38 is positioned on the second section 36. A stopper member 68 is coupled to the main arm 12 and is positioned such that the grip 38 is prevented from moving beyond a top side 70 of the main arm 12.

A rear engagement member 40 is threadably coupled to the rear arm 24 adjacent to the distal end 26 and has a pointed engagement end 42 facing toward the front arm 28. A front engagement member 44 is threadably coupled to the front arm 28 adjacent to the terminal end 30 and has a pointed engagement end 46 facing toward the rear arm 24. The rear engagement member 40 and the front engagement member 44 are a same distance from the main arm 12. The front engagement member 44 is configured to engage an end 50 of a log 48 and urge the log 48 against the rear engagement member 40 when the handle 32 is pivoted away from the main arm 12 to releasably secure the log 48 to the main arm 12. The front engagement member 44 and the rear engagement member 40 are pointed to penetrate the log 48 and facilitate gripping of the log. The front engagement member 44 and the rear engagement member 40 are threadably coupled so that they can be removed for sharpening or replacement but may alternatively be provided as a non-removable structure.

A front spacer 52 and a rear spacer 54 are each coupled to the main arm 12 and extend downwardly therefrom. The front spacer 52 and the rear spacer 54 facilitate positioning the log 48 between the front engagement member 44 and the rear engagement member 40. The front spacer 52 is coupled to the front member 18 of the main arm 12, and the rear spacer 54 is coupled to the rear member 20 of the main arm 12. The rear spacer 54 includes a notch 56 in a front side 58 of the rear spacer 54 and is positioned adjacent to a lower end 60 of the rear spacer 54. The front side 58 defines an edge 62 of the rear spacer 54 facing the front engagement member 44 and is configured for engaging a log 48 having a length shorter than a distance from the rear spacer 54 to the front end 14 of the main arm 12.

A wedge 64 is coupled to the distal end 26 of the rear arm 24 and extends downwardly therefrom. The wedge 64 tapers to define a tooth 66 and may be pointed. The wedge 64 is configured for insertion between the log 48 and an abutting surface such that the wedge 64 may be used to move the log 48 away from the surface so that it may be handled by the tool 10.

In use, the log 48 is positioned between the front engagement member 44 and the rear engagement member 40. Then the handle 32 is moved away from the main arm 12 so that the front engagement member 44 urges the log toward the rear engagement member 40 to grip the log. If the log 48 has a length shorter than a distance from the rear spacer 54 to the front end 14 of the main arm 12, the log 48 may be gripped between the front engagement member 44 and the edge 62 of the rear spacer 54 instead. If more significant adjustment is needed, the front member 18 and the rear member 20 of the main arm 12 may be attached in a different one of the plurality of positions. If the log 48 is abutting a surface, the wedge 64 can be inserted between the log 48 and the surface such that the log 48 can be urged away from the surface for handling by the tool 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A log handling tool comprising:
    a main arm having a front end and a rear end;
    a rear arm being coupled to said rear end of said main arm and extending downwardly therefrom, said rear arm having distal end with respect to said main arm;
    a front arm being pivotally coupled to said main arm adjacent to said front end, said front arm extending downwardly from said main arm in a same direction as said rear arm, said front arm having a terminal end positioned distal to said main arm;
    a handle being attached to said front arm, said main arm being positioned between said handle and said terminal end;
    a rear engagement member being coupled to said rear arm adjacent to said distal end, said rear engagement member having an engagement end being facing toward said front arm;
    a front engagement member being coupled to said front arm adjacent to said terminal end, said front engagement member having an engagement end facing toward said rear arm, wherein said front engagement member is configured to engage an end of a log and urge the log against said rear engagement member when the handle is pivoted away from the main arm to releasably secure the log to the main arm;
    a spacer being coupled to said main arm and extending downwardly therefrom, said spacer facilitating positioning the log between said front engagement member and said rear engagement member; and
    a wedge being coupled to said distal end of said rear arm and extending downwardly therefrom, said wedge tapering to define a tooth, wherein said wedge is configured for insertion between the log and a surface.

2. The tool of claim 1, further comprising a distance between said front end and said rear end being adjustable.

3. The tool of claim 2, further comprising said main arm comprising a front member and a rear member, said rear member being securable to said front member in a plurality of positions to adjust said distance between said front end and said rear end.

4. The tool of claim 3, further comprising said rear member being attachable to said front member by a pair of couplers extending through each of said front and rear members.

5. A log handling tool comprising:
    a main arm having a front end and a rear end, a distance between said front end and said rear end being adjustable, said main arm comprising a front member and a rear member, said rear member being securable to said front member in a plurality of positions to adjust said distance between said front end and said rear end;

a rear arm being coupled to said rear end of said main arm and extending downwardly therefrom, said rear arm having distal end with respect to said main arm;

a front arm being pivotally coupled to said main arm adjacent to said front end, said front arm extending downwardly from said main arm in a same direction as said rear arm, said front arm having a terminal end positioned distal to said main arm;

a handle being attached to said front arm, said main arm being positioned between said handle and said terminal end;

a rear engagement member being coupled to said rear arm adjacent to said distal end, said rear engagement member having an engagement end being facing toward said front arm;

a front engagement member being coupled to said front arm adjacent to said terminal end, said front engagement member having an engagement end facing toward said rear arm, wherein said front engagement member is configured to engage an end of a log and urge the log against said rear engagement member when the handle is pivoted away from the main arm to releasably secure the log to the main arm;

a spacer being coupled to said main arm and extending downwardly therefrom, said spacer facilitating positioning the log between said front engagement member and said rear engagement member; and said spacer being one of a pair of spacers including a front spacer and a rear spacer, said front spacer being coupled to said front member of said main arm, said rear spacer being coupled to said rear member of said main arm.

6. The tool of claim 1, further comprising said handle including a first section extending upwardly from said main arm and a second section extending rearwardly.

7. The tool of claim 6, further comprising a grip being positioned on said second section of said handle.

8. The tool of claim 1, further comprising said engagement end of said rear engagement member being pointed.

9. The tool of claim 1, further comprising said engagement end of said front engagement member being pointed.

10. The tool of claim 1, further comprising said front engagement member being threadably coupled to said front arm.

11. The tool of claim 1, further comprising said rear engagement member being threadably coupled to said rear arm.

12. The tool of claim 1, further comprising said rear and front engagement members being a same distance from said main arm.

13. The tool of claim 1, further comprising:

a distance between said front end and said rear end being adjustable, said main arm comprising a front member and a rear member, said rear member being securable to said front member in a plurality of positions to adjust said distance between said front end and said rear end, said rear member being attachable to said front member by a pair of couplers extending through each of said front and rear members;

said handle including a first section extending upwardly from said main arm and a second section extending rearwardly, a grip being positioned on said second section;

said engagement end of said rear engagement member being pointed, said rear engagement member being threadably coupled to said rear arm;

said front engagement member being threadably coupled to said front arm, said rear and front engagement members being a same distance from said main arm;

said spacer being a front spacer;

a rear spacer, each of said front spacer and said rear spacer being coupled to said main arm and extending downwardly therefrom, said front spacer and said rear spacer facilitating positioning the first log between said front engagement member and said rear engagement member, said front spacer being coupled to said front member of said main arm, said rear spacer being coupled to said rear member of said main arm; and said rear spacer including a notch in a front side of said rear spacer and adjacent a lower end of said rear spacer, said notch defining an edge of said rear spacer facing said front engagement member for engaging a log having a length shorter than a distance from said rear spacer to said front end of said main arm.

14. A log handling tool comprising:

a main arm having a front end and a rear end;

a rear arm being coupled to said rear end of said main arm and extending downwardly therefrom, said rear arm having distal end with respect to said main arm;

a front arm being pivotally coupled to said main arm adjacent to said front end, said front arm extending downwardly from said main arm in a same direction as said rear arm, said front arm having a terminal end positioned distal to said main arm;

a handle being attached to said front arm, said main arm being positioned between said handle and said terminal end;

a rear engagement member being coupled to said rear arm adjacent to said distal end, said rear engagement member having an engagement end being facing toward said front arm;

a front engagement member being coupled to said front arm adjacent to said terminal end, said front engagement member having an engagement end facing toward said rear arm, wherein said front engagement member is configured to engage an end of a log and urge the log against said rear engagement member when the handle is pivoted away from the main arm to releasably secure the log to the main arm;

a spacer being coupled to said main arm and extending downwardly therefrom, said spacer facilitating positioning the log between said front engagement member and said rear engagement member; and said spacer including a notch in a front side of said spacer and adjacent a lower end of said spacer, said notch defining an edge of said spacer facing said front engagement member for engaging a log having a length shorter than a distance from said spacer to said front end of said main arm.

* * * * *